(12) United States Patent
Iriondo et al.

(10) Patent No.: US 12,145,412 B2
(45) Date of Patent: Nov. 19, 2024

(54) DAMPER WITH VOLUME REDUCING INSERT SLEEVE

(71) Applicant: DRiV Automotive Inc., Southfield, MI (US)

(72) Inventors: Jon Iriondo, Southfield, MI (US); Verónica Diez, Southfield, MI (US)

(73) Assignee: DRiV Automotive Inc., Northville, MI (US)

( * ) Notice: Subject to any disclaimer, the term of this patent is extended or adjusted under 35 U.S.C. 154(b) by 724 days.

(21) Appl. No.: 17/463,924

(22) Filed: Sep. 1, 2021

(65) Prior Publication Data

US 2023/0061032 A1    Mar. 2, 2023

(51) Int. Cl.
*B60G 13/08*        (2006.01)
*B60G 17/08*        (2006.01)
(Continued)

(52) U.S. Cl.
CPC ............. *B60G 13/08* (2013.01); *B60G 17/08* (2013.01); *F16F 9/18* (2013.01); *F16F 9/369* (2013.01);
(Continued)

(58) Field of Classification Search
CPC .... B60G 13/08; B60G 17/08; B60G 2202/24; B60G 2204/65; B60G 2206/41;
(Continued)

(56) References Cited

U.S. PATENT DOCUMENTS 3,038,562 A * 6/1962 Bourcier de Carbon et al. ..........
                                                    F16F 9/3405
                                                    188/314
4,106,412 A * 8/1978 Farris ..................... B61F 5/127
                                                    267/221
(Continued)

FOREIGN PATENT DOCUMENTS

CN          112377553 A      2/2021
DE     102016207958 A1    11/2017
(Continued)

OTHER PUBLICATIONS

International Search Report and Written Opinion regarding International Patent Application No. PCT/US2022/040582, dated Dec. 9, 2022.

*Primary Examiner* — Bradley T King
*Assistant Examiner* — James K Hsiao
(74) *Attorney, Agent, or Firm* — Harness, Dickey & Pierce, P.L.C.

(57) ABSTRACT

A shock absorber including a pressure tube, a piston assembly slidably disposed within the pressure tube, and a fluid transfer tube that extends about the pressure tube, and a reserve tube that extends about the fluid transfer tube is provided. The piston assembly divides an inner volume of the pressure tube into first and second working chambers. An intermediate chamber between the pressure tube and the fluid transfer tube is arranged in fluid communication with the first working chamber. A reservoir chamber between the fluid transfer tube is arranged in fluid communication with
(Continued)

the intermediate chamber. An insert is disposed within the intermediate chamber, reducing the volume of the intermediate chamber and defining a fluid transfer channel between the first working chamber and the reservoir chamber.

20 Claims, 7 Drawing Sheets

(51) Int. Cl.
 *F16F 9/18* (2006.01)
 *F16F 9/36* (2006.01)
(52) U.S. Cl.
 CPC ...... *B60G 2202/24* (2013.01); *B60G 2204/62* (2013.01); *B60G 2206/41* (2013.01); *B60G 2500/104* (2013.01); *B60G 2800/162* (2013.01); *F16F 2222/12* (2013.01); *F16F 2228/066* (2013.01); *F16F 2230/30* (2013.01); *F16F 2232/08* (2013.01); *F16F 2234/02* (2013.01)
(58) Field of Classification Search
 CPC ......... B60G 2500/104; B60G 2800/162; F16F 9/18; F16F 9/369; F16F 2222/12; F16F 2228/066; F16F 2234/02
 See application file for complete search history.

(56) References Cited

U.S. PATENT DOCUMENTS

| | | | |
|---|---|---|---|
| 5,070,970 A | 12/1991 | Johnston et al. | |
| 5,106,053 A * | 4/1992 | Miller | F16F 9/46 |
| | | | 251/129.05 |
| 5,163,538 A | 11/1992 | Derr et al. | |
| 5,163,706 A | 11/1992 | Maguran, Jr. et al. | |
| 5,282,645 A | 2/1994 | Spakowski et al. | |
| 6,668,986 B2 * | 12/2003 | Moradmand | F16F 9/466 |
| | | | 188/266.2 |
| 8,820,495 B2 * | 9/2014 | King | F16F 9/348 |
| | | | 188/289 |
| 8,910,963 B2 | 12/2014 | Battlogg et al. | |
| 9,388,877 B2 | 7/2016 | Konakai et al. | |
| 9,441,698 B2 | 9/2016 | Suzuki et al. | |
| 9,528,565 B2 | 12/2016 | Marking | |
| 10,399,402 B2 | 9/2019 | Prevot | |
| 10,987,988 B2 | 4/2021 | Garcia et al. | |
| 2008/0314704 A1 * | 12/2008 | Deferme | F16F 9/3481 |
| | | | 188/266 |
| 2009/0242341 A1 * | 10/2009 | Ashiba | F16F 9/348 |
| | | | 188/283 |
| 2012/0018264 A1 * | 1/2012 | King | F16F 9/348 |
| | | | 188/282.1 |
| 2014/0265203 A1 * | 9/2014 | Zuleger | B60G 15/12 |
| | | | 280/124.16 |
| 2019/0001783 A1 * | 1/2019 | Garcia | F16F 9/18 |
| 2019/0176557 A1 | 6/2019 | Marking et al. | |
| 2021/0054902 A1 * | 2/2021 | Nakano | F16F 9/187 |

FOREIGN PATENT DOCUMENTS

| | | |
|---|---|---|
| DE | 102009053232 B4 | 10/2018 |
| JP | 2014190359 A | 10/2014 |
| WO | WO-2018/112375 A1 | 6/2018 |
| WO | WO-2019/005931 A1 | 1/2019 |

* cited by examiner

DAMPER WITH VOLUME REDUCING INSERT SLEEVE

FIELD

The present disclosure relates to a hydraulic damper or shock absorber adapted for use in a suspension system such as the suspension systems used for automotive vehicles. More particularly, the present invention relates to a sleeve for a shock absorber that defines a fluid transfer channel.

BACKGROUND

This section provides background information related to the present disclosure which is not necessarily prior art.

Shock absorbers are used in connection with automobile suspension systems and other vehicle suspension systems to absorb bumps and unwanted vibrations. Shock absorbers are generally connected between the body of a vehicle and an unsprung component of the suspension system. A piston is located within the shock absorber and is connected to the vehicle body through a piston rod. The piston creates two working chambers inside the shock absorber that are filled with a damping fluid (e.g., oil). The piston has passageways and valve disk stacks that limit the flow of the damping fluid between the two working chambers of the shock absorber when the shock absorber undergoes compression and extension (e.g., rebound). As a result, the shock absorber produces a damping force that counteracts suspension movements and vibration which could otherwise be transmitted from the suspension of the automobile to the body.

In a semi-active shock absorber, the amount of damping force generated during compression and extension movements of the shock absorber is controlled by using an electromechanical valve that controls the amount of fluid flow of the damping fluid through a secondary passageway between the two working chambers of the shock absorber. Such passageways can be formed in a number of different ways; however, there remains a need for damper designs that provide a secondary passageway for the electromechanical valve in a cost effective manner without sacrificing the performance of the shock absorber.

SUMMARY

This section provides a general summary of the disclosure, and is not a comprehensive disclosure of its full scope or all of its features.

The present disclosure provides for a shock absorber that includes a pressure tube having an inner volume, a reserve tube that extends annularly about the pressure tube, and a fluid transfer tube positioned radially between the pressure tube and the reserve tube. The fluid transfer tube extends longitudinally between a first transfer tube end and a second transfer tube end. A piston assembly is slidably disposed within the pressure tube. The piston assembly includes a piston that separates the inner volume of the pressure tube into a first working chamber and a second working chamber.

A reservoir chamber is defined radially between the reserve tube and the fluid transfer tube. The damper further includes a reservoir valve having a reservoir valve inlet and a reservoir valve outlet. The reservoir valve outlet is arranged in fluid communication with the reservoir chamber.

An intermediate chamber is defined radially between the fluid transfer tube and the pressure tube and longitudinally between a sealing collar and an insert. The sealing collar is arranged in sealing engagement with the first transfer tube end. The insert includes a collar portion that is arranged in sealing engagement with the second transfer tube end.

The intermediate chamber includes an internal volume. The insert includes a channel defining portion that extends longitudinally from the collar portion of the insert into the intermediate chamber. As a result, the channel defining portion of the insert reduces the internal volume of the intermediate chamber and defines a fluid transfer channel in the intermediate chamber that is arranged in fluid communication with the reservoir valve inlet. Advantageously, the reduction in internal volume provided by the channel defining portion of the insert reduces foaming of the fluid in the intermediate chamber. In addition, by using a combination of the sealing collar and the insert to seal the opposing ends of the intermediate chamber and create the fluid transfer channel, the damper design disclosed herein is cheaper, lighter, quieter, and easier manufacture, assemble, and disassemble (for service) than existing solutions.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
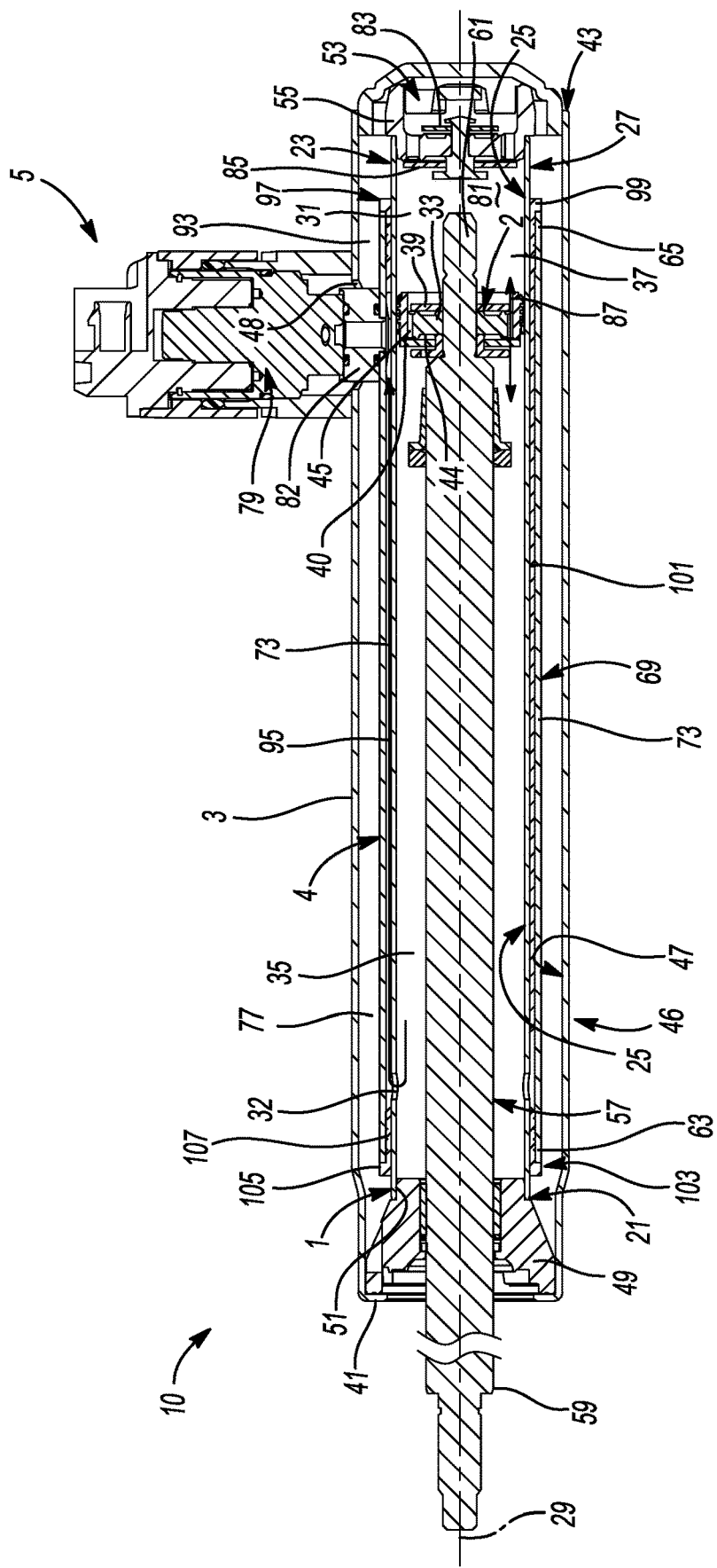
FIG. 1 is a side cross-sectional view of an exemplary shock absorber constructed in accordance with the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The terms "abuts" and "abutting" as used herein means that one element is positioned in direct contact with or in close proximity to another element.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "inside," "outside," "internal," "external," "beneath," "below," "lower," "above," "upper," and the like, may be used herein for ease of description to describe one element or feature's relationship to another element(s) or feature(s) as illustrated in the figures. The terms "outer," "outside," and "external" do not necessarily require the element to be on the outside of the shock absorber. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-5, an exemplary shock absorber 10 is shown. In this example, the shock absorber 10 includes a pressure tube 1, a piston assembly 2, a reserve tube 3, and a fluid transfer tube 4. The pressure tube 1 extends longitudinally between a first pressure tube end 21 and a second pressure tube end 23. The pressure tube 1 has an internal surface 25 and an external surface 27. The pressure tube 1 extends annularly about a longitudinal axis 29 to define an inner volume 31. The pressure tube 1 includes at least one outlet 32 that extends through the pressure tube 1 from the internal surface 25 to the external surface 27.

The piston assembly 2 is slidably disposed within the pressure tube 1. The piston assembly 2 includes a piston 33 that separates the inner volume 31 into a first working chamber 35 and a second working chamber 37. The piston assembly 2 also includes a piston assembly rebound valve 39 that opens and closes one or more rebound passages 44 in the piston 33, and a piston assembly compression valve 40 that opens and closes one or more compression passages 45 in the piston 33.

The reserve tube 3 extends annularly about the pressure tube 1 and longitudinally between a first reserve tube end 41 and a second reserve tube end 43. The reserve tube 3 includes an outer surface 46, an inner surface 47, and a valve opening 48 that extends through the reserve tube 3 from the inner surface 47 to the outer surface 46. A rod guide 49 is received in the first reserve tube end 41. The rod guide 49 includes a rod guide shoulder 51 that mates with the first pressure tube end 21 in a press-fit. A base valve assembly 53 includes a base valve body 55 that is received in the second reserve tube end 43 in a press-fit.

A piston rod 57 extends through the rod guide 49 in sliding engagement. The piston rod 57 extends longitudinally between a first piston rod end 59 and a second piston rod end 61. The first piston rod end 59 is configured to be connected to a suspension component of a vehicle, and the second piston rod end 61 is configured to be connected to the piston 33.

Figure 2:
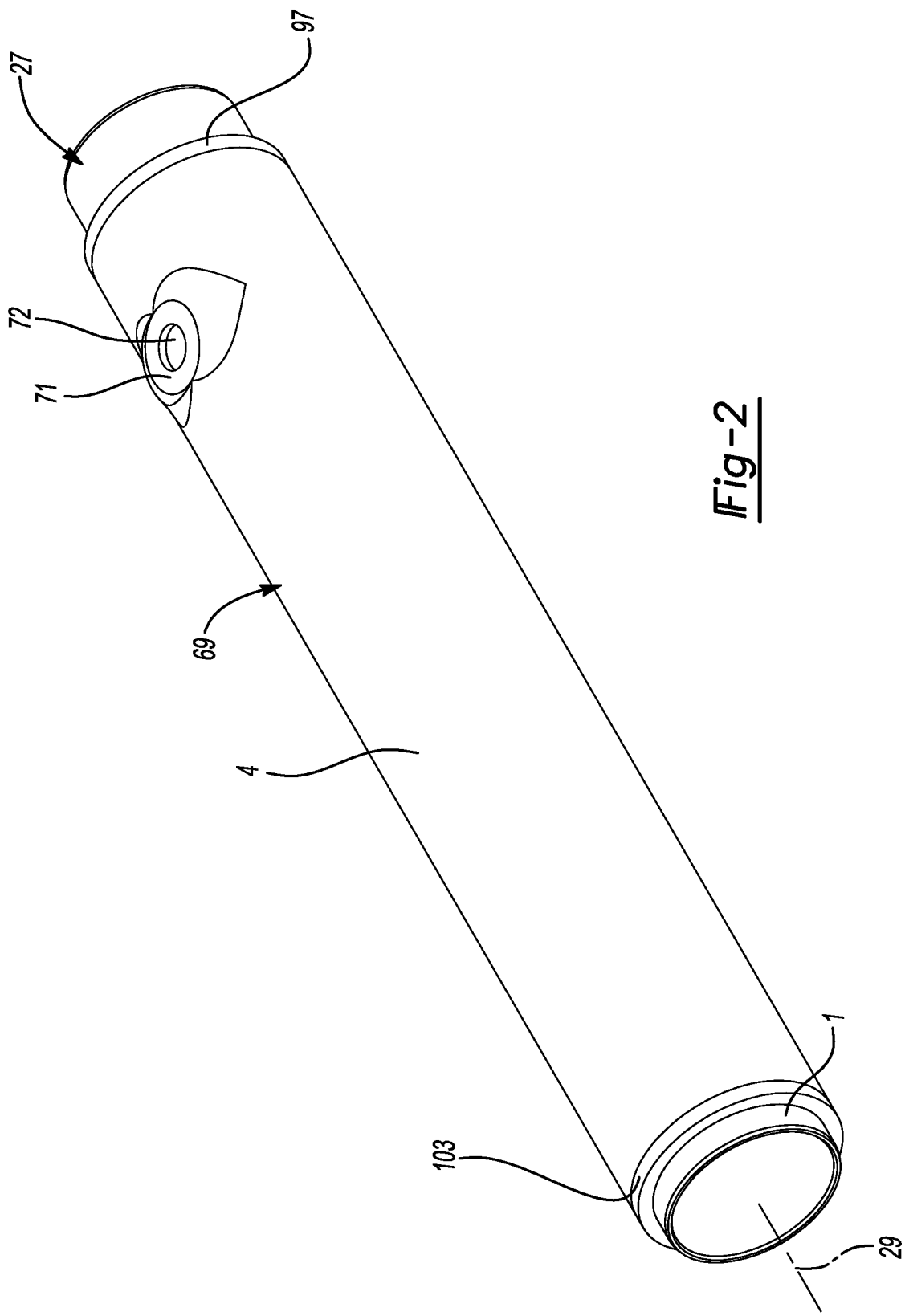
FIG. 2 is a side perspective view of an exemplary pressure tube and fluid transfer tube assembly constructed in accordance with the present disclosure.
Figure 3:
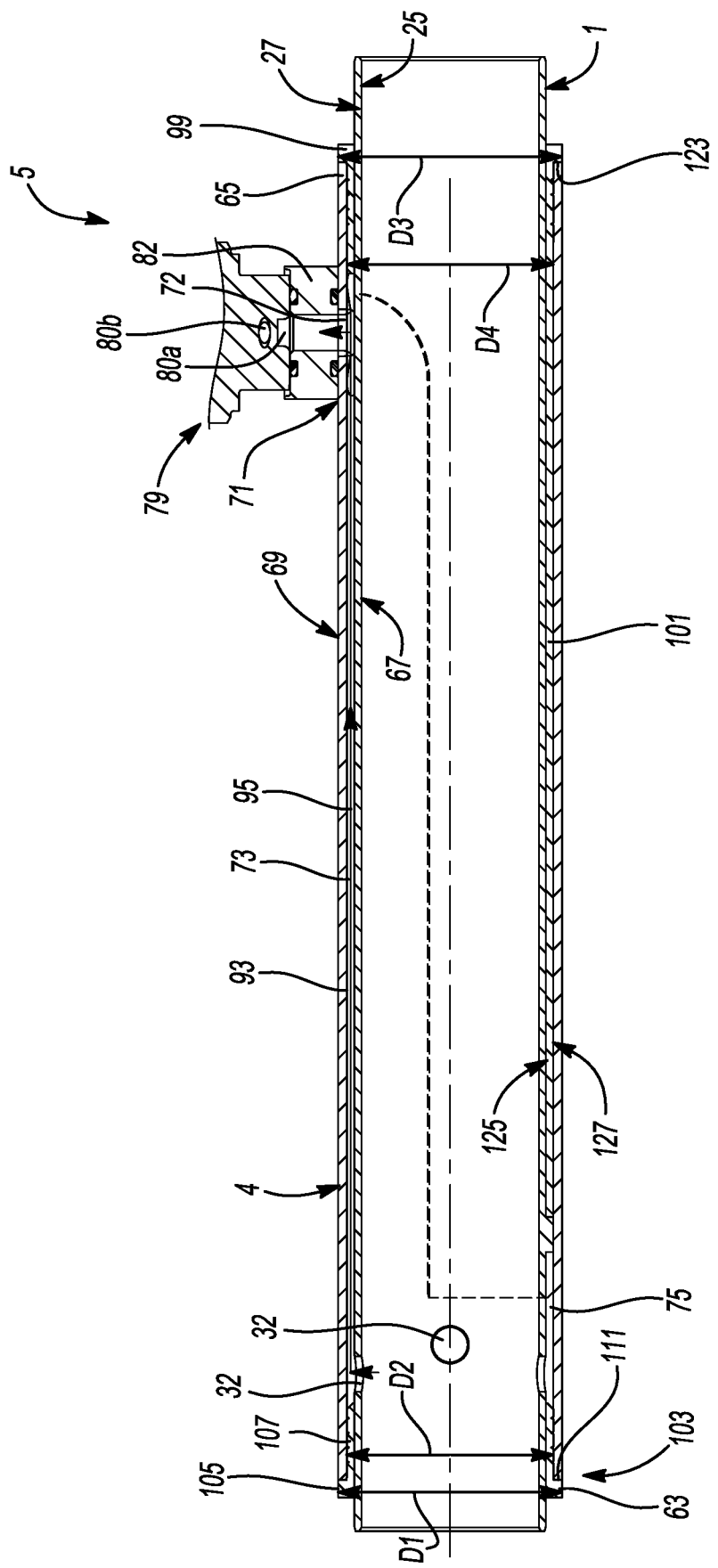
FIG. 3 is a side cross-sectional view of the exemplary assembly shown in FIG. 2 that has been connected to an electromechanical reservoir valve.

The fluid transfer tube 4 is positioned radially between the pressure tube 1 and the reserve tube 3. The fluid transfer tube 4 extends longitudinally between a first transfer tube end 63 and a second transfer tube end 65. As shown in FIGS. 2 and 3, the fluid transfer tube 4 has an inside surface 67 and an outside surface 69. The fluid transfer tube 4 has a valve connection point 71 on the outside surface 69 of the fluid transfer tube between the first transfer tube end 63 and the second transfer tube end 65. A through bore 72, positioned at the valve connection point 71, extends through the fluid transfer tube 4 from the inside surface 67 to the outside surface 69. In some embodiments, as depicted in FIG. 2, the valve connection point 71 may comprise a localized flattened area on the outside surface 69 of the fluid transfer tube 4. The fluid transfer tube 4 may also be substantially concentrically oriented with the longitudinal axis 29. As best seen in FIG. 3, an intermediate chamber 73 is defined radially between the inside surface 67 of the fluid transfer tube 4 and the external surface 27 of the pressure tube 1. The intermediate chamber 73 includes an internal volume 75.

As shown in FIG. 1, a reservoir chamber 77 is defined radially between the inner surface 47 of the reserve tube 3 and the outside surface 69 of the fluid transfer tube 4. A reservoir valve assembly 5 is arranged in fluid communication with the valve opening 48 in the reserve tube 3 and is connected to the reserve tube 3 and the valve connection point 71 of the fluid transfer tube 4. As best seen in FIGS.

1 and 3, the reservoir valve assembly 5 includes a reservoir valve 79 and a valve seat 82. The reservoir valve 79 is an electromechanical valve and has a reservoir valve inlet 80a and a reservoir valve outlet 80b. The reservoir valve inlet 80a is arranged in fluid communication with the through bore 72 in the fluid transfer tube 4 and thus the intermediate chamber 73 and the first working chamber 35. The reservoir valve outlet 80b is arranged in fluid communication with the valve opening 48 in the reserve tube 3 and thus the reservoir chamber 77.

In the illustrated embodiments, the first working chamber 35 and the second working chamber 37 contain a damping fluid 81, such as oil. A first fluid flow path 87 is defined by the rebound and compression passages 44, 45 in the piston 33. The flow of damping fluid 81 in either direction (i.e., from the first working chamber 35 to the second working chamber 37 during an extension stroke or from the second working chamber 37 to the first working chamber 35 during a compression stroke) along the first fluid flow path 87 is limited by the piston assembly rebound valve 39 and the piston assembly compression valve 40 when the shock absorber 10 undergoes extension (i.e., rebound) and compression strokes, respectively.

Figure 5:
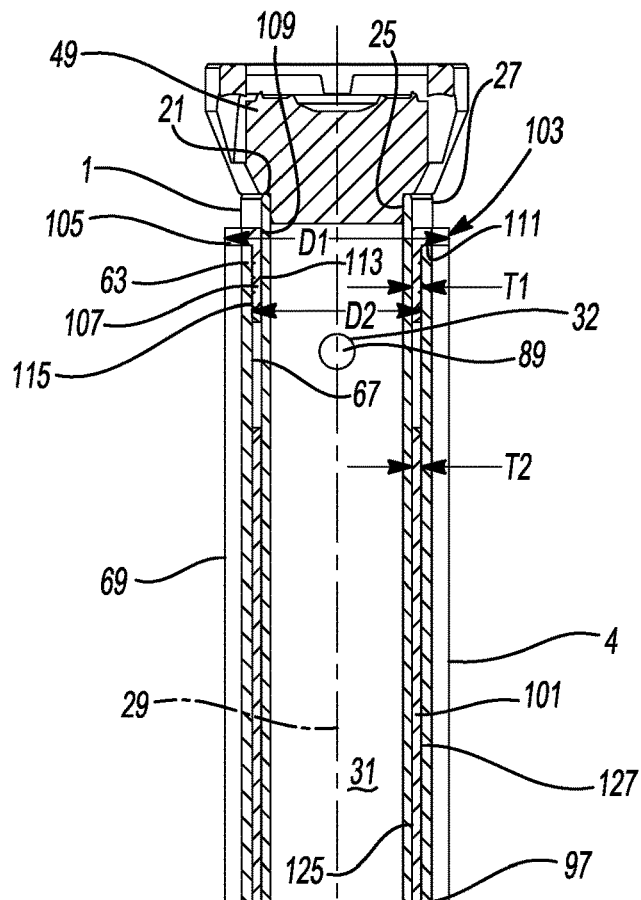
FIG. 5 is a side cross-sectional view of the exemplary assembly shown in FIG. 4.

As best seen in FIG. 5, the base valve assembly 53 includes a first base valve 83 that opens and closes a first set of passages 84 in the base valve body 55 and a second base valve 85 that opens and closes a second set of passages 86 in the base valve body 55. The base valve body 55 includes a plurality of circumferentially spaced slots 88 that are arranged in fluid communication with the reservoir chamber 77. As a result, the first and second base valves 83, 85 restrict the flow of the damping fluid 81 between the second working chamber 37 and the reservoir chamber 77. While other configurations are possible, it should be appreciated that in the illustrated examples, the piston assembly rebound valve 39, the piston assembly compression valve 40, and the first and second base valves 83, 85 are passive valves each comprising a spring-disc or spring-disc stack located inside the shock absorber 10 (i.e., internal to the reserve tube 3), while the reservoir valve 79 is an active, electromechanical valve that extends out from the reserve tube 3.

As shown in FIG. 5, the outlet 32 of the pressure tube 1 may comprise four round openings 89 in the pressure tube 1 that are positioned adjacent to the first transfer tube end 63. A second fluid flow path 91 communicates fluid between the first working chamber 35, through the round openings 89, and into the intermediate chamber 73.

As best seen in FIG. 5, a fluid transfer channel 93 extends longitudinally within the intermediate chamber 73. In this manner, the fluid transfer channel 93 defines a third fluid flow path 95 that extends linearly from the outlet 32 of the pressure tube 1 to the through bore 72 in the fluid transfer tube 4 and thus the reservoir valve inlet 80a of the reservoir valve 79 in a direction that is parallel to the longitudinal axis 29. As such, the reservoir valve 79 is positioned in fluid communication with and controls fluid flow between the intermediate chamber 73 and the reservoir chamber 77, the first working chamber 35 is fluidly connected to the reservoir chamber 77 via the fluid transfer channel 93 and the reservoir valve 79, and the first and second base valves 83, 85 control fluid flow between the reservoir chamber 77 and the second working chamber 37. It should also be appreciated that, generally speaking, fluid flows along the second and third fluid flow paths 91, 95 (i.e., from the first working chamber 35 to the reservoir valve assembly 5) during both the extension and compression strokes of the shock absorber 10.

As shown in FIGS. 1-5, an insert 97 is positioned in the intermediate chamber 73. With additional reference to FIGS. 6-8, the insert 97 includes a collar portion 99 that is received in the second transfer tube end 65 in a press-fit. The insert 97 includes a channel defining portion 101 that extends longitudinally from the collar portion 99 into the second transfer tube end 65 to a distal end 98. The longitudinal extent of the channel defining portion 101 of the insert 97 is selected to place the distal end 98 of the insert 97 longitudinally between the outlet 32 of the pressure tube 1 and the through bore 72 in the fluid transfer tube 4. The channel defining portion 101 is shaped as a split tube and has a partial cylinder (i.e., a half-pipe) that defines the fluid transfer channel 93 in the intermediate chamber 73. The shock absorber 10 further includes a sealing collar 103 that is received in the first transfer tube end 63 in a press-fit. The sealing collar 103 has a flange portion 105 and a body portion 107 that extends longitudinally from the flange portion 105 into the first transfer tube end 63. Accordingly, the insert 97 and the sealing collar 103 cooperate to define/seal the intermediate chamber 73 between the pressure tube 1 and the fluid transfer tube 4 at opposing ends.

With reference to FIGS. 5-8, the flange portion 105 of the sealing collar 103 is shaped as a ring and has an outer flange diameter D1. The sealing collar 103 also includes an inner flange surface 109 abutting the external surface 27 of the pressure tube 1 and an abutment surface 111 that is arranged perpendicular to the inner flange surface 109 and that abuts the first transfer tube end 63. The body portion 107 of the sealing collar 103 has a cylindrical shape and extends longitudinally from the abutment surface 111 of the flange portion 105. The body portion 107 of the sealing collar 103 has an outer body diameter D2. The body portion 107 includes an inner cylindrical surface 113 abutting the external surface 27 of the pressure tube 1 and an outer cylindrical surface 115 abutting the inside surface 67 of the fluid transfer tube 4. The body portion 107 of the sealing collar 103 also includes a body wall thickness T1 that extends radially between the inner cylindrical surface 113 and the outer cylindrical surface 115 of the body portion 107. The outer body diameter D2 of the body portion 107 is less than the outer flange diameter D1 of the flange portion 105.

Figure 7:
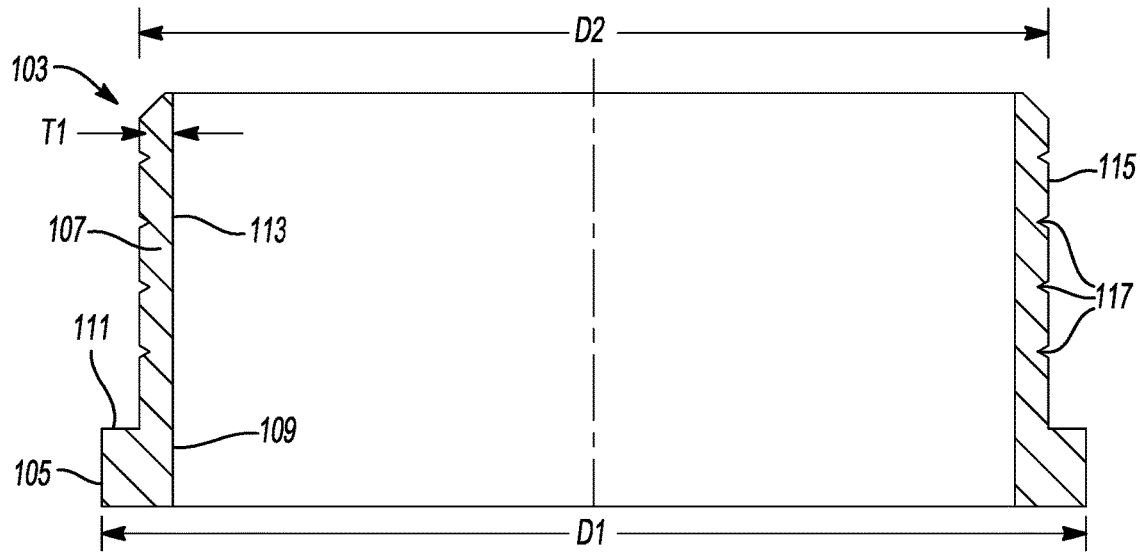
FIG. 7 is a side cross-sectional view of the sealing collar of the exemplary assembly shown in FIG. 4.

As shown in FIG. 7, the body portion 107 of the sealing collar 103 includes a first set of grooves 117 that are provided in the outer cylindrical surface 115 of the body portion 107. In the illustrated example, the grooves 117 in the first set of grooves 117 have a triangular cross-sectional shape and run circumferentially along the outer cylindrical surface 115 of the body portion 107 of the sealing collar 103. The grooves 117 in the first set of grooves 117 are longitudinally spaced at regular intervals from the flange portion 105 of the sealing collar 103.

As shown in FIGS. 5-8, the collar portion 99 of the insert 97 is ring shaped and has an outer collar diameter D3. The collar portion 99 includes an inner collar surface 121 abutting the external surface 27 of the pressure tube 1 and a step surface 123 that is arranged perpendicular to the inner collar surface 121 and that abuts the second transfer tube end 65. The channel defining portion 101 of the insert 97 extends longitudinally from the step surface 123 of the collar portion 99 and has an outer sleeve diameter D4. The channel defining portion 101 also includes an inner sleeve surface 125 facing the external surface 27 of the pressure tube 1, and an outer sleeve surface 127 that faces the inside surface 67 of the fluid transfer tube 4. The channel defining portion 101 also includes a sleeve wall thickness T2 that extends radially between the inner sleeve surface 125 and the outer sleeve surface 127.

Figure 6:
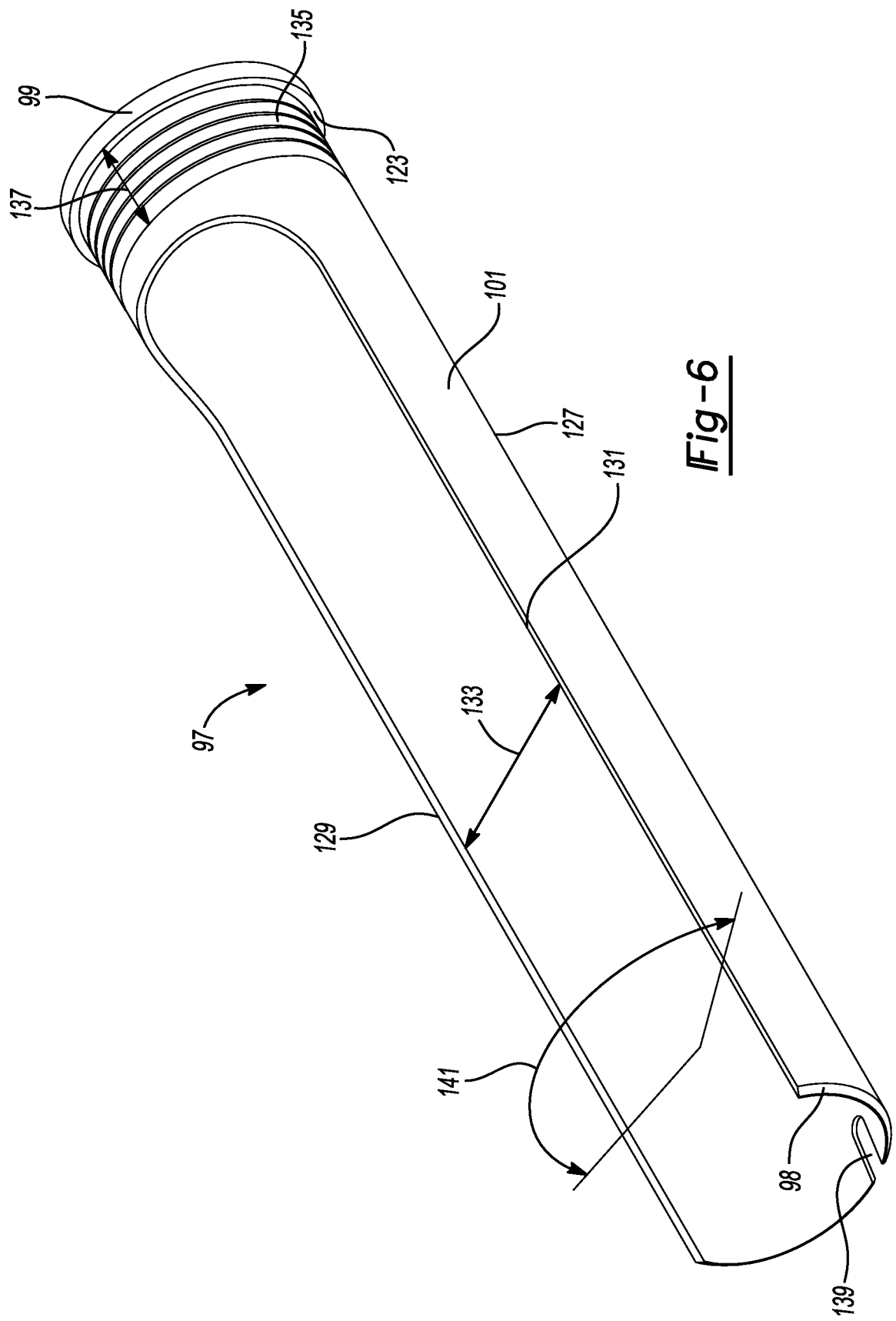
FIG. 6 is a side perspective view of the insert of the exemplary assembly shown in FIG. 4.

As shown in FIG. 6, the channel defining portion 101 of the insert 97 is shaped as a split tube and has first and second longitudinal edges 129, 131 that are circumferentially spaced apart by a gap 133. In the illustrated example, the gap 133 is an angle that is more than 90 degrees, but less than 180 degrees. It should be appreciated from the Figures that the fluid transfer channel 93 in the intermediate chamber 73 is formed by the gap 133 between the first and second longitudinal edges 129, 131 of the channel defining portion 101 of the insert 97. Thus, the fluid transfer channel 93 runs parallel to the longitudinal axis 29 and has a limited circumferential extent 141 of less than 180 degrees. It should also be appreciated that the insert 97 defines only one (i.e., a single) fluid transfer channel 93 in the intermediate chamber 73. By reducing the internal volume 75 of the intermediate chamber 73, the insert 97 reduces foaming in the intermediate chamber 73 and also reduces noise by reducing the amplitude of harmonics within the intermediate chamber 73. In addition, the insert 97 shifts the frequency of harmonics within the intermediate chamber 73 to higher frequencies that are less perceptible during operation of the vehicle.

Figure 8:
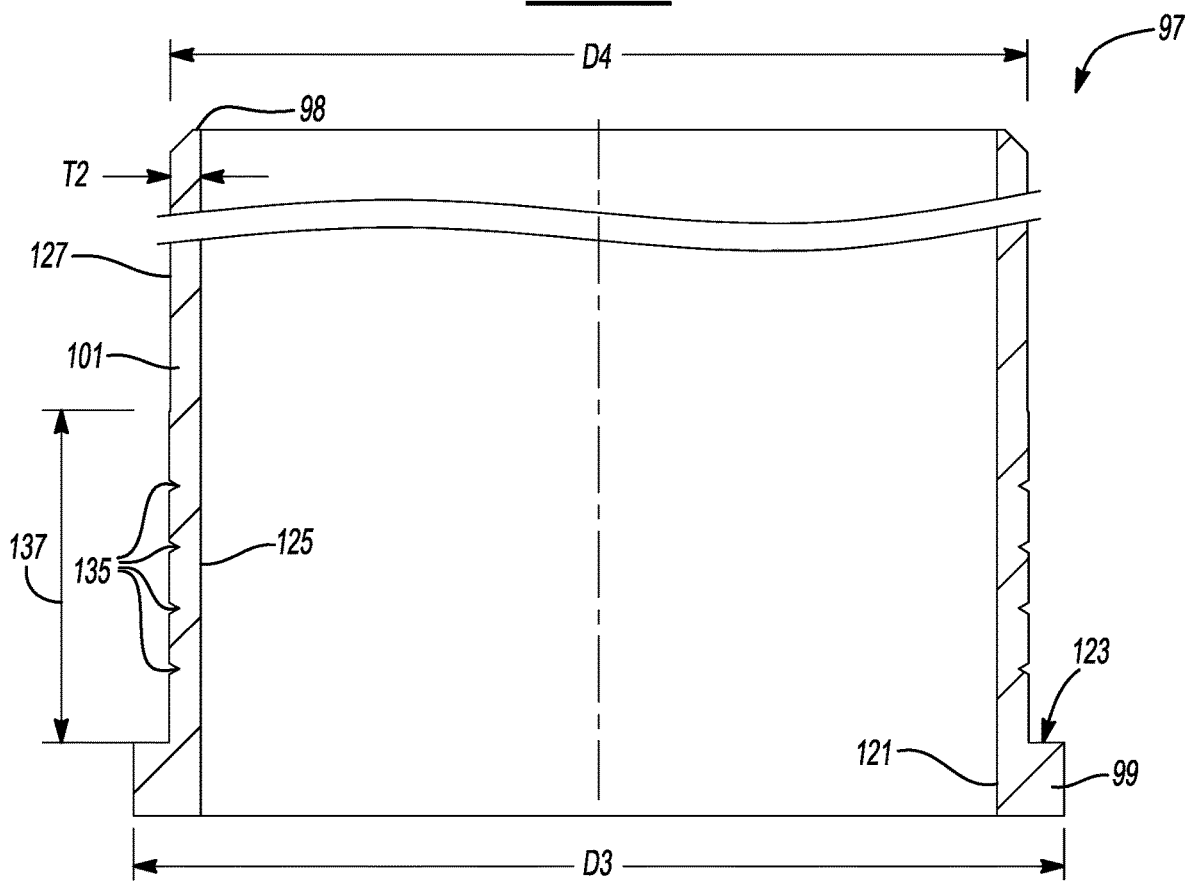
FIG. 8 is a side cross-sectional view of part of the exemplary insert shown in FIG. 6.

As shown in FIG. 8, the channel defining portion 101 of the insert 97 includes a second set of grooves 135. The second set of grooves 135 are arranged along a grooved portion 136 of the insert 97 that is arranged between the collar portion 99 and the gap 133 defining the fluid transfer channel 93. In the illustrated example, the grooves 135 in the second set of grooves 135 have a triangular cross-sectional shape, run circumferentially along the outer sleeve surface 127, and are longitudinally spaced at regular intervals from the step surface 123 of the collar portion 99.

The first and second sets of grooves 117, 135 in the sealing collar 103 and insert 97 reduce the surface area of the outer cylindrical surface 115 of the body portion 107 of the sealing collar 103 and the outer sleeve surface 127 of the channel defining portion 101 of the insert 97 to ease assembly. In addition, the first and second sets of grooves 117, 135 in the sealing collar 103 and insert 97 create voids/air pockets once assembled, whose suction makes it more difficult to separate the sealing collar 103 and insert 97 from the ends 63, 65 of the fluid transfer tube 4. The sealing improvement provided by this structure means that the shock absorber 10 can withstand higher internal operating pressures and the need for o-ring seals between the pressure tube 1 and the fluid transfer tube 4 is eliminated. In addition, the pressure tube 1 and the fluid transfer tube 4 can be made as a straight, cylindrical tubes, without any bends, crimps, steps, or changes in diameter. The insert 97 and the sealing collar 103 may be constructed out of a variety of suitable materials such as plastics, steels, alloys, or composites. By way of a non-limiting example, the insert 97 and the sealing collar 103 may be constructed from injection molded polyamide or sintered metal.

Figure 4:
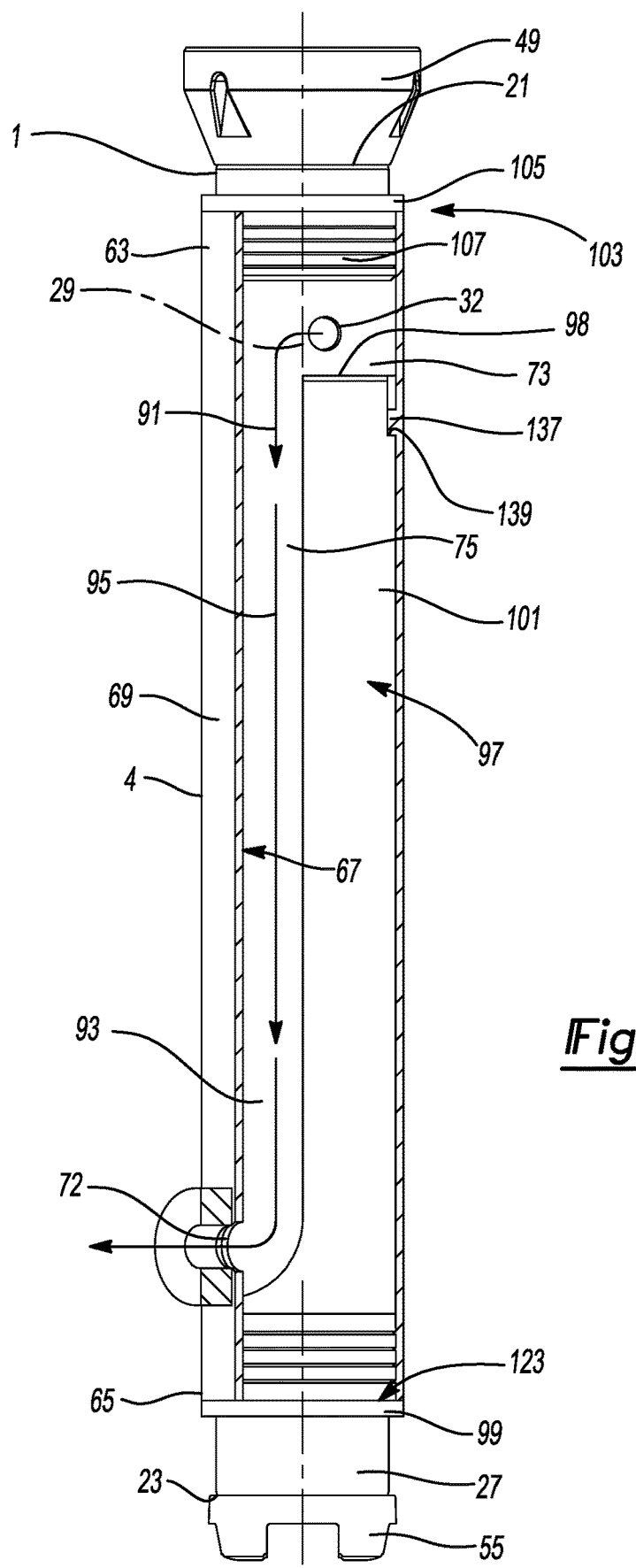
FIG. 4 is a side section view of an exemplary assembly including the pressure tube, fluid transfer tube, sealing collar, and insert of the exemplary shock absorber shown in FIG. 1, where a portion of the fluid transfer tube has been cut away for illustration purposes.

With reference to FIGS. 4 and 6, the fluid transfer tube 4 may optionally include at least one alignment projection 137. The alignment projection 137 extends radially inwardly into the intermediate chamber 73 and is received in an alignment notch 139 in the insert 97 to ensure proper alignment of the insert 97 in the intermediate chamber 73 and to prevent rotation of the insert 97 relative to the fluid transfer tube 4.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A shock absorber, comprising:
a pressure tube having an inner volume;
a reserve tube extending annularly about the pressure tube;
a fluid transfer tube positioned radially between the pressure tube and the reserve tube, the fluid transfer tube extending longitudinally between a first transfer tube end and a second transfer tube end;
a piston assembly slidably disposed within the pressure tube, the piston assembly including a piston that separates the inner volume of the pressure tube into a first working chamber and a second working chamber;
a reservoir chamber defined radially between the reserve tube and the fluid transfer tube;
a reservoir valve having a reservoir valve inlet and a reservoir valve outlet, the reservoir valve outlet being arranged in fluid communication with the reservoir chamber; and
an intermediate chamber defined radially between the fluid transfer tube and the pressure tube and longitudinally between a sealing collar that is arranged in sealing engagement with the first transfer tube end and an insert that includes a collar portion that is arranged in sealing engagement with the second transfer tube end, the intermediate chamber including an internal volume and the insert including a channel defining portion that extends longitudinally from the collar portion of the insert into the intermediate chamber to reduce the internal volume of the intermediate chamber and define a fluid transfer channel in the intermediate chamber that is arranged in fluid communication with the reservoir valve inlet.

2. The shock absorber as set forth in claim 1, wherein the sealing collar has a flange portion and a body portion that extends longitudinally from the flange portion and that is received in the first transfer tube end.

3. The shock absorber as set forth in claim 2, wherein the flange portion of the sealing collar is shaped as a ring and has an inner flange surface abutting an external surface of the pressure tube and an abutment surface perpendicular to the inner flange surface that abuts the first transfer tube end.

4. The shock absorber as set forth in claim 3, wherein the body portion of the sealing collar includes a first set of grooves.

5. The shock absorber as set forth in claim 4, wherein the grooves in the first set of grooves have a triangular cross-sectional shape.

6. The shock absorber as set forth in claim 4, wherein the body portion of the sealing collar includes an outer cylindrical surface abutting the fluid transfer tube and wherein the grooves in the first set of grooves run circumferentially along the outer cylindrical surface of the body portion of the sealing collar.

7. The shock absorber as set forth in claim 4, wherein the grooves in the first set of grooves are longitudinally spaced at regular intervals from the flange portion of the sealing collar.

8. The shock absorber as set forth in claim 1, wherein the channel defining portion of the insert is shaped as a split tube and has first and second longitudinal edges that are circumferentially spaced apart by a gap.

9. The shock absorber as set forth in claim 8, wherein the channel defining portion of the insert includes a second set of grooves that are arranged along a grooved portion of the insert that is arranged between the collar portion of the insert and the gap that defines the fluid transfer channel.

10. The shock absorber as set forth in claim 9, wherein the grooves in the second set of grooves have a triangular cross-sectional shape.

11. The shock absorber as set forth in claim 9, wherein the channel defining portion of the insert includes an outer sleeve surface facing the fluid transfer tube and wherein the grooves in the second set of grooves run circumferentially along the outer sleeve surface.

12. The shock absorber as set forth in claim 8, wherein the fluid transfer channel in the intermediate chamber is formed by the gap between the first and second longitudinal edges of the channel defining portion of the insert.

13. The shock absorber as set forth in claim 1, wherein the fluid transfer tube includes a valve connection point and a through-bore, positioned at the valve connection point, that extends through the fluid transfer tube to the intermediate chamber and that is arranged in fluid communication with the reservoir valve inlet.

14. The shock absorber as set forth in claim 13, wherein one of the fluid transfer tube and the pressure tube includes at least one alignment projection that extends into the intermediate chamber and is received in an alignment notch in the insert to insure proper alignment of the through-bore in the fluid transfer tube with the fluid transfer channel defined by the insert and to prevent rotation of the insert relative to the fluid transfer tube.

15. The shock absorber as set forth in claim 1, wherein the pressure tube extends annularly about a longitudinal axis and wherein the fluid transfer channel runs parallel to the longitudinal axis and has a limited circumferential extent of less than 180 degrees such that the insert defines only one fluid transfer channel in the intermediate chamber.

16. The shock absorber as set forth in claim 1, wherein the collar portion of the insert is ring shaped and includes an inner collar surface that abuts an external surface of the pressure tube and a step surface perpendicular to the inner collar surface that abuts the second transfer tube end.

17. A shock absorber, comprising:
a pressure tube having an inner volume;
a reserve tube extending annularly about the pressure tube, the reserve tube extending longitudinally between a first reserve tube end and a second reserve tube end;
a fluid transfer tube positioned radially between the pressure tube and the reserve tube, the fluid transfer tube extending longitudinally between a first transfer tube end and a second transfer tube end and including a through-bore;
a piston assembly slidably disposed within the pressure tube, the piston assembly including a piston that separates the inner volume of the pressure tube into a first working chamber and a second working chamber;
a reservoir chamber defined radially between the reserve tube and the fluid transfer tube;
a reservoir valve having a reservoir valve inlet and a reservoir valve outlet, the reservoir valve inlet being arranged in fluid communication with the through-bore in the fluid transfer tube and the reservoir valve outlet being arranged in fluid communication with the reservoir chamber; and
an intermediate chamber defined radially between the fluid transfer tube and the pressure tube and longitudinally between a sealing collar that is received in the first transfer tube end in a press-fit and an insert that includes a collar portion that is received in the second transfer tube end in a press-fit, the intermediate chamber including an internal volume and the insert including a channel defining portion that extends longitudinally from the collar portion of the insert into the intermediate chamber to reduce the internal volume of the intermediate chamber and define a fluid transfer channel in the intermediate chamber to provide a fluid flow path extending between the first working chamber and the reservoir chamber.

18. The shock absorber as set forth in claim 17, wherein the piston assembly includes at least one piston assembly valve that restricts fluid flow between the first and second working chambers through a first fluid flow path that extends through the piston, wherein the pressure tube includes at least one outlet that extends through the pressure tube between the first working chamber and the intermediate chamber to define a second fluid flow path that communicates fluid between the first working chamber and the intermediate chamber, and wherein the fluid transfer channel defines a third fluid flow path that communicates fluid between the intermediate chamber and the reservoir valve inlet.

19. A shock absorber, comprising:
a pressure tube having an inner volume and including at least one outlet;
a reserve tube extending annularly about the pressure tube between a first reserve tube end and a second reserve tube end and including a valve opening;
a fluid transfer tube positioned radially between the pressure tube and the reserve tube, the fluid transfer tube extending longitudinally between a first transfer tube end and a second transfer tube end and including a valve connection point with a through-bore that extends through the fluid transfer tube;
a piston assembly slidably disposed within the pressure tube, the piston assembly including a piston that separates the inner volume of the pressure tube into a first working chamber and a second working chamber;
a reservoir chamber defined radially between the reserve tube and the fluid transfer tube;
a reservoir valve assembly that is at least partially received in the valve opening in the reserve tube and that is connected to the valve connection point on the fluid transfer tube, the reservoir valve assembly including a reservoir valve that includes a reservoir valve inlet connected in fluid communication with the through-bore in the fluid transfer tube and a reservoir valve outlet connected in fluid communication with the reservoir chamber via the valve opening in the reserve tube;
a base valve assembly including a base valve body that is received in the second reserve tube end, the base valve assembly including a first base valve that is arranged in fluid communication with the reservoir chamber and a second base valve that is arranged in fluid communication with the second working chamber; and
an intermediate chamber defined radially between the fluid transfer tube and the pressure tube and longitudinally between a sealing collar that is arranged in sealing engagement with the first transfer tube end and an insert that includes a collar portion that is arranged in sealing engagement with the second transfer tube end, the intermediate chamber including an internal volume and the insert including a channel defining portion that extends longitudinally from the collar portion of the insert into the intermediate chamber to reduce the internal volume of the intermediate chamber and define a fluid transfer channel in the intermediate chamber that is arranged in fluid communication with the reservoir valve inlet.

20. The shock absorber of claim 19, wherein the pressure tube extends annularly about a longitudinal axis, the fluid transfer channel extends longitudinally within the intermediate chamber, the fluid transfer channel defines a fluid flow path that extends linearly from the at least one outlet of the pressure tube to the through-bore in the fluid transfer tube in a direction that is parallel to the longitudinal axis, the reservoir valve positioned in fluid communication with and controlling fluid flow between the intermediate chamber and the reservoir chamber, the first working chamber fluidly connected to the reservoir chamber via the fluid transfer channel and the reservoir valve, the first and second base valves controlling fluid flow between the reservoir chamber and the second working chamber.

\* \* \* \* \*